United States Patent
Sato et al.

(10) Patent No.: US 6,821,016 B2
(45) Date of Patent: Nov. 23, 2004

(54) INFRARED CLINICAL THERMOMETER AND TEMPERATURE STATE ESTIMATION METHOD, INFORMATION NOTIFICATION METHOD, AND MEASUREMENT OPERATION METHOD THEREOF

(75) Inventors: Taiga Sato, Kyoto (JP); Hiroyuki Ota, Kyoto (JP); Tetsuya Sato, Kyoto (JP); Yoshihide Onishi, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/160,194

(22) Filed: Jun. 4, 2002

(65) Prior Publication Data

US 2002/0181539 A1 Dec. 5, 2002

(30) Foreign Application Priority Data

Jun. 4, 2001 (JP) ........................ 2001-168826
Jul. 9, 2001 (JP) ........................ 2001-208555

(51) Int. Cl.[7] .............. G01J 5/10; A61B 6/00
(52) U.S. Cl. ............... 374/121; 374/128; 600/474; 600/549
(58) Field of Search ............... 374/121, 128, 374/172, 133; 600/474, 412, 549

(56) References Cited

U.S. PATENT DOCUMENTS

| | | | |
|---|---|---|---|
| 4,634,294 A | * | 1/1987 | Christol et al. |
| 5,282,685 A | * | 2/1994 | Koegler |
| 5,333,784 A | | 8/1994 | Pompei |
| 5,872,362 A | * | 2/1999 | Pompei |
| 6,045,257 A | * | 4/2000 | Pompei et al. |
| 6,056,435 A | * | 5/2000 | Pompei |
| 6,059,452 A | * | 5/2000 | Smith et al. |
| 6,186,959 B1 | * | 2/2001 | Canfield et al. |
| 6,220,750 B1 | * | 4/2001 | Palti |
| 6,292,685 B1 | * | 9/2001 | Pompei |

FOREIGN PATENT DOCUMENTS

| | | |
|---|---|---|
| JP | 06-142063 | 5/1994 |
| WO | WO 92/10133 | 6/1992 |

* cited by examiner

*Primary Examiner*—Gail Verbitsky
(74) *Attorney, Agent, or Firm*—Morrison & Foerster LLP

(57) ABSTRACT

Temperature states of a clinical thermometer body and an environment are estimated by temperatures measured by a first temperature sensor integrally formed together with an infrared sensor arranged to the distal end of a probe and a second temperature sensor arranged on the bottom side of a probe holder, and processes suitable for the respective temperature states are performed. An estimation error or the reliability of an estimation value is calculated by the temperatures to notify a user of the estimation error or the reliability by an LCD or the like.

20 Claims, 12 Drawing Sheets

[FIG. 1]
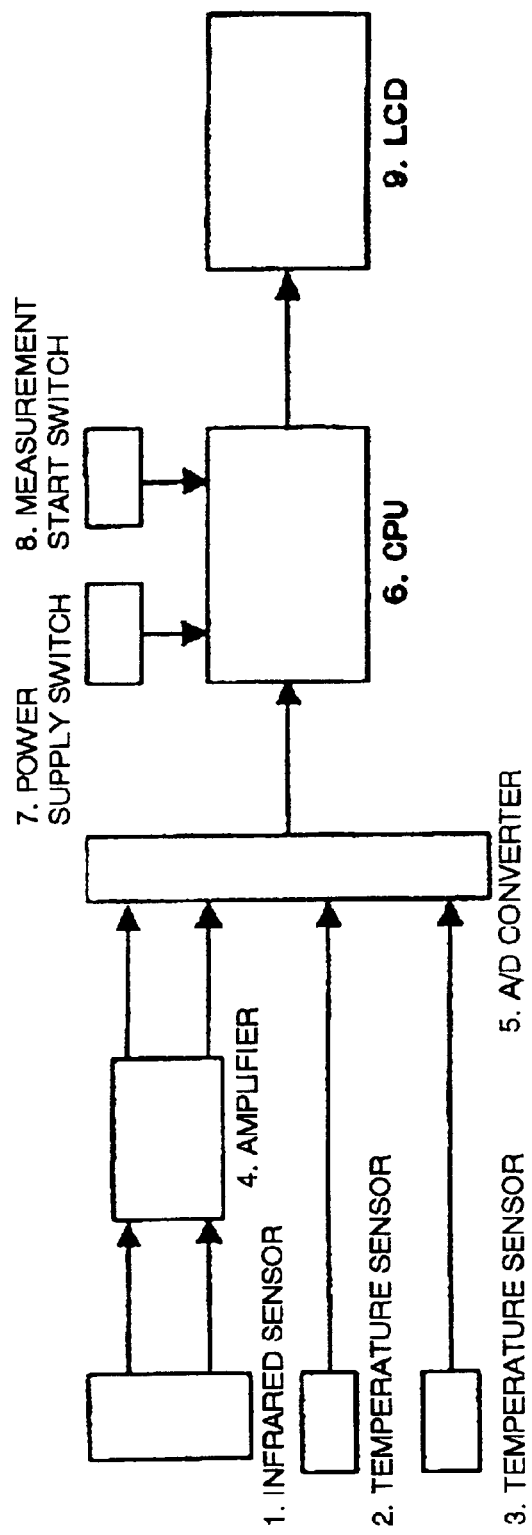

[FIG. 2]
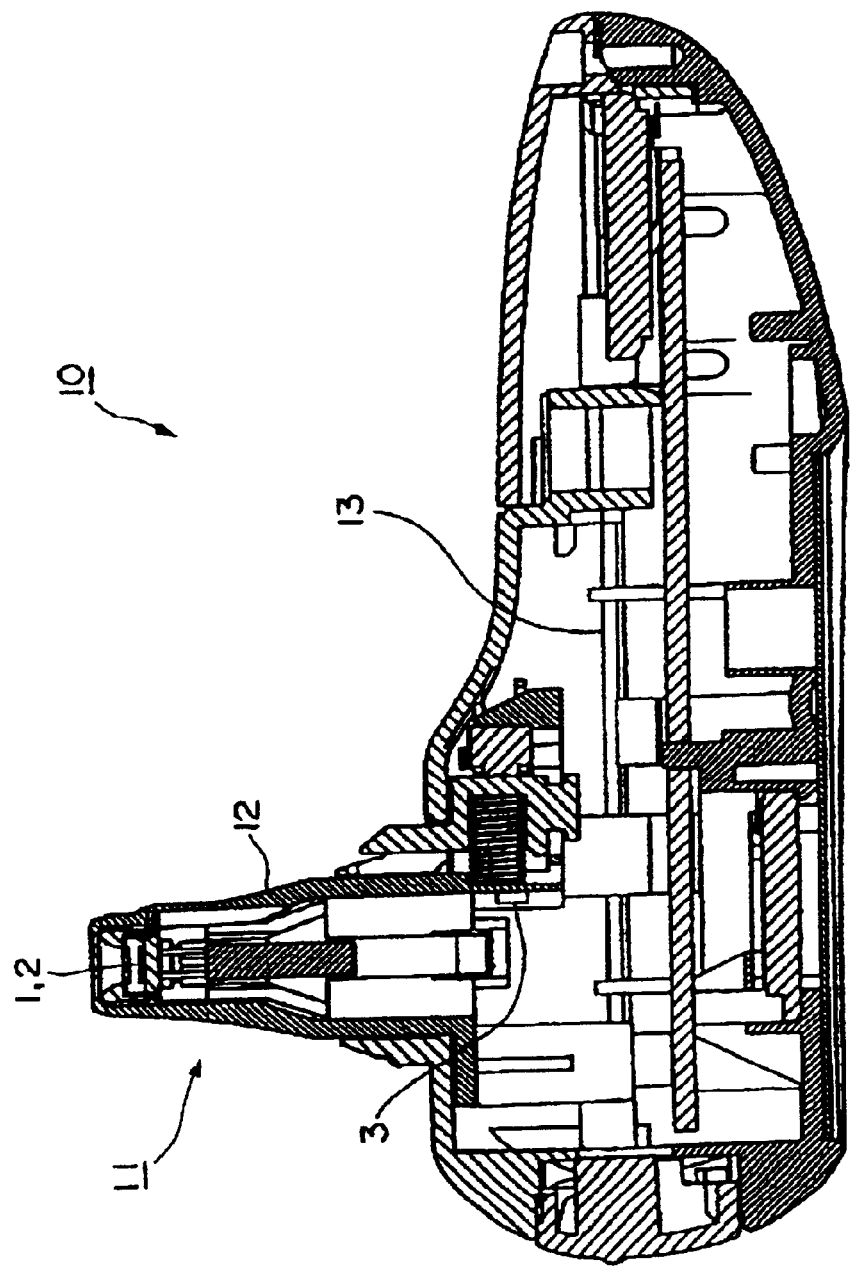

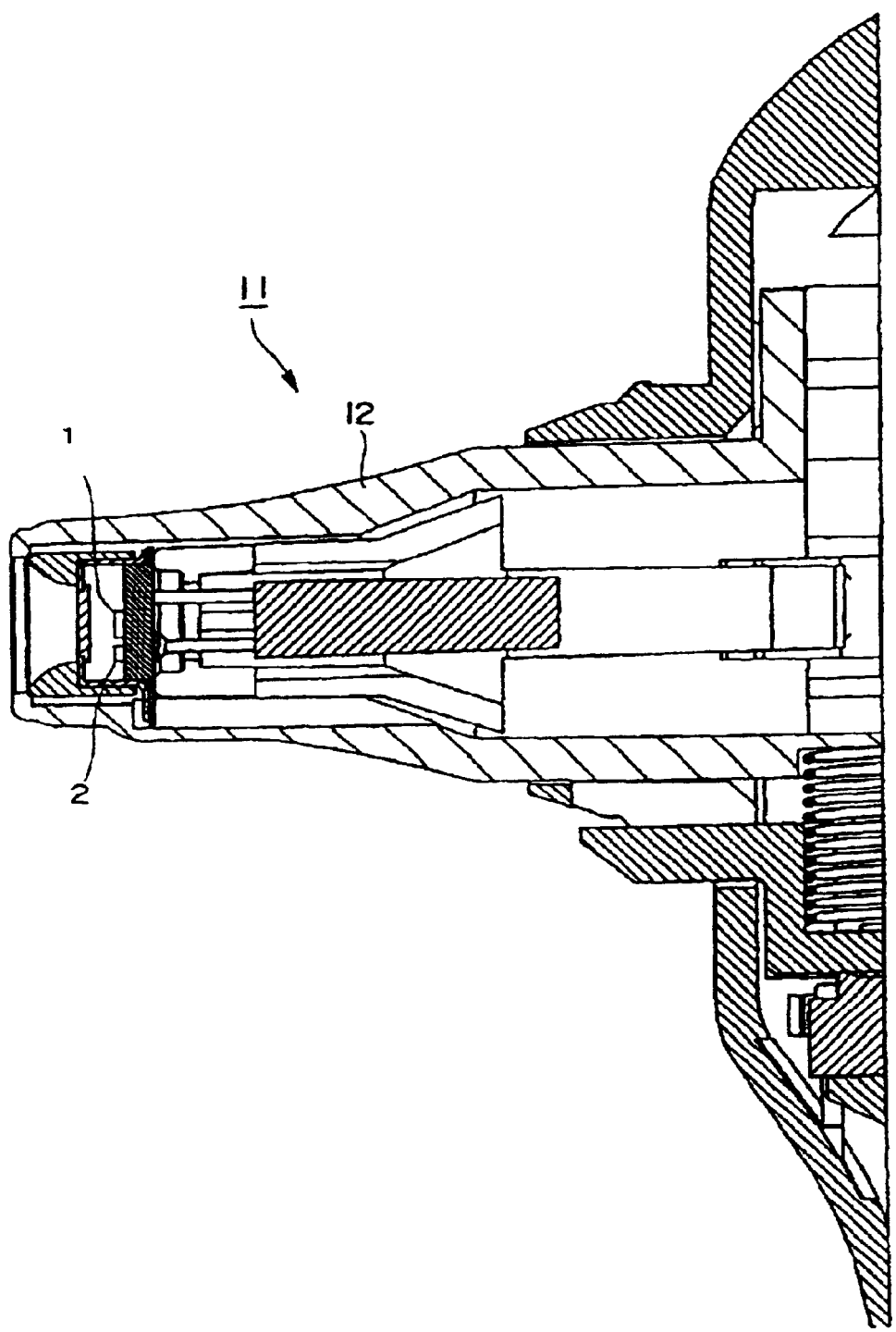
[FIG. 3]

[FIG. 4]
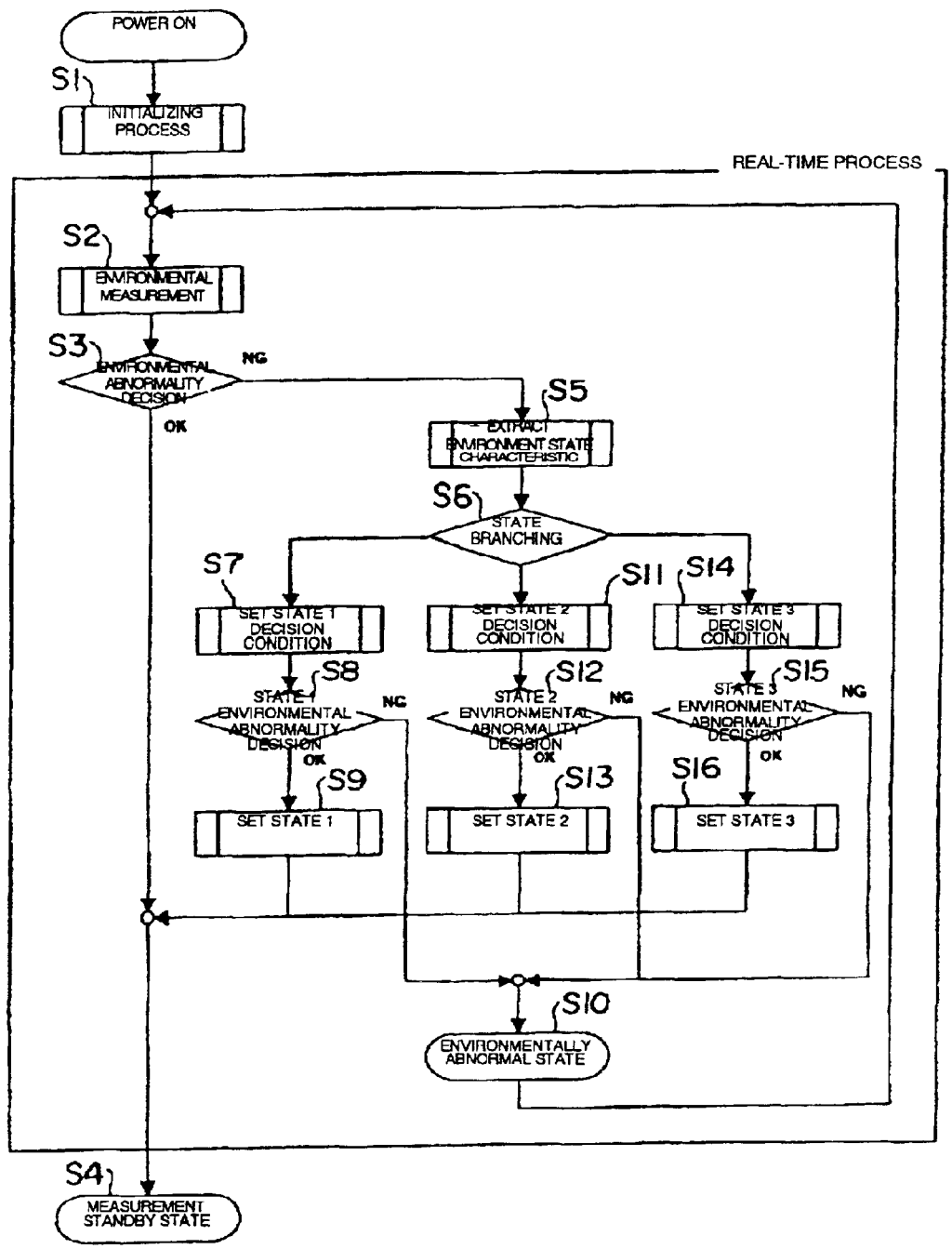

[FIG. 5]
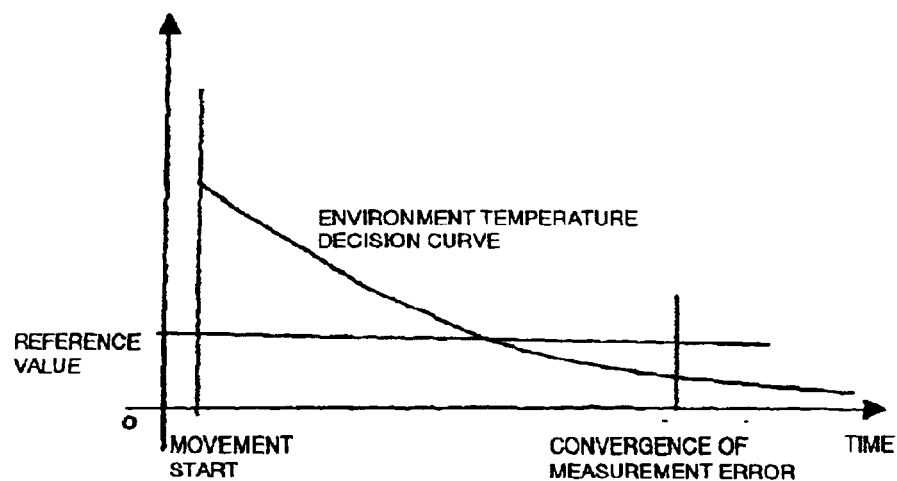
[FIG. 6]
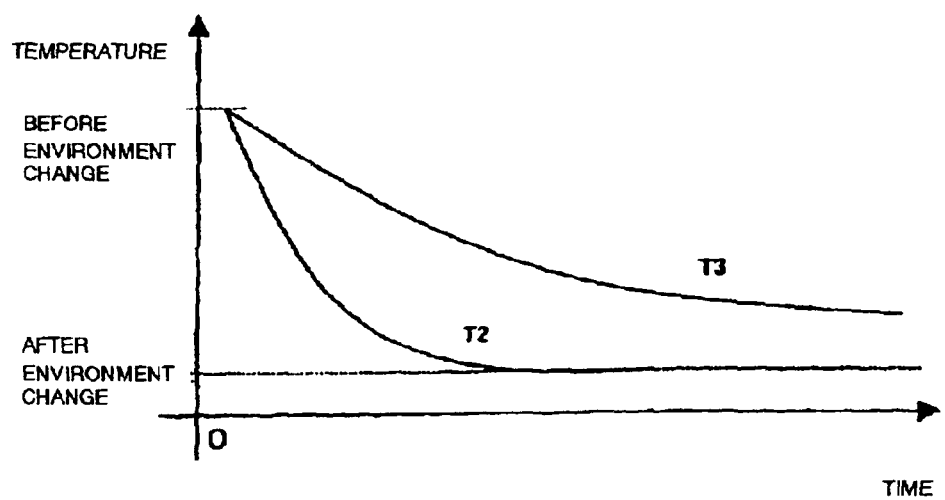

[FIG. 7]
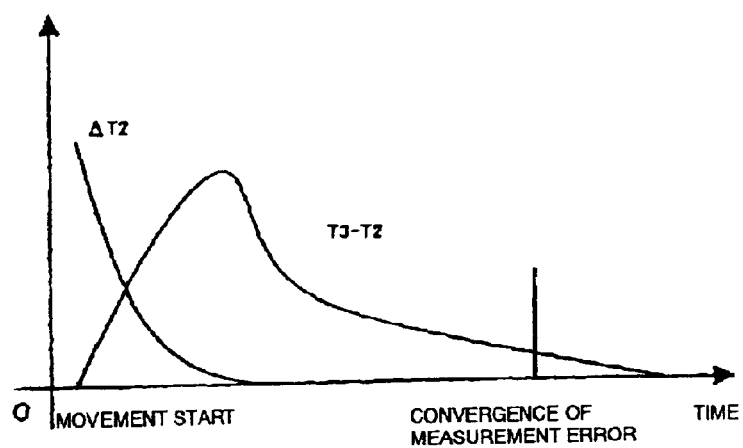
[FIG. 8]
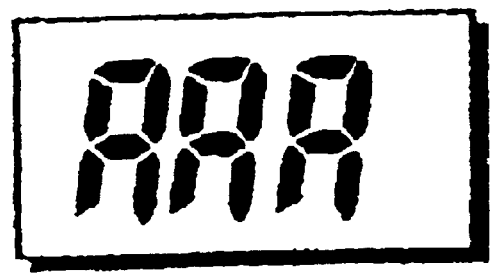
[FIG. 9]

[FIG. 10]
| CHANGE IN T2 | | SIZE OF T2 AND T3 | STATE | CONDITION |
|---|---|---|---|---|
| + | HEATING | + | DISTAL END IS HOT | MEASUREMENT OPERATION/ ENVIRONMENT TEMPERATURE CHANGE | FROM LOW TEMPERATURE TO HIGH TEMPERATURE |
| − | COOLING | − | DISTAL END IS COLD | ENVIRONMENT TEMPERATURE CHANGE | FROM LOW TEMPERATURE TO HIGH TEMPERATURE |
| + | HEATING | − | DISTAL END IS COLD | − | − |
| − | COOLING | + | DISTAL END IS HOT | RE-MEASUREMENT | − |
[FIG. 11]
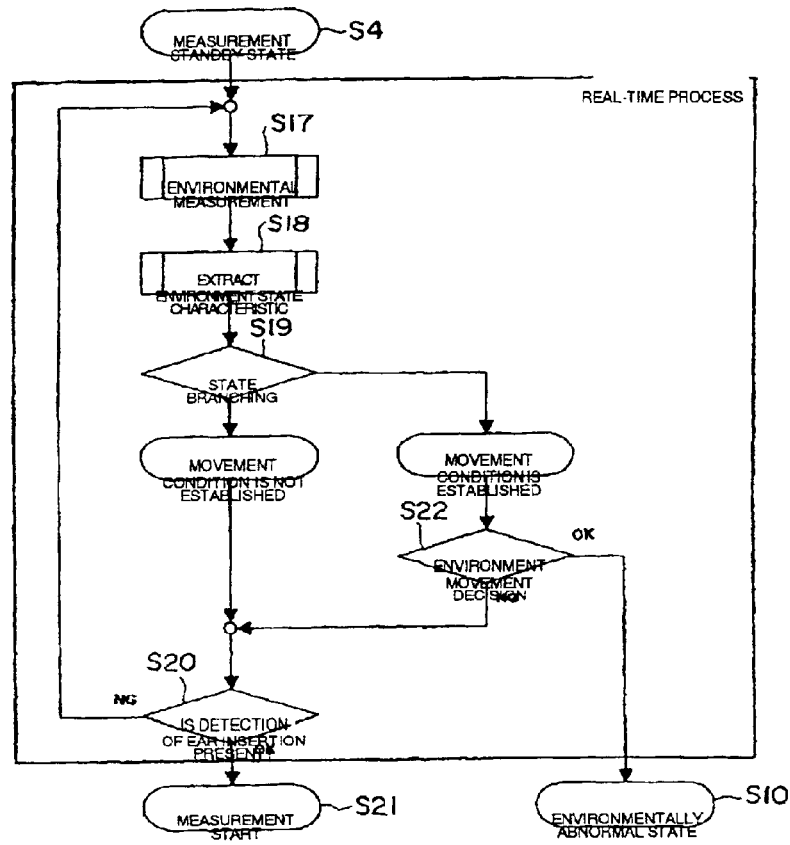

[FIG. 12]
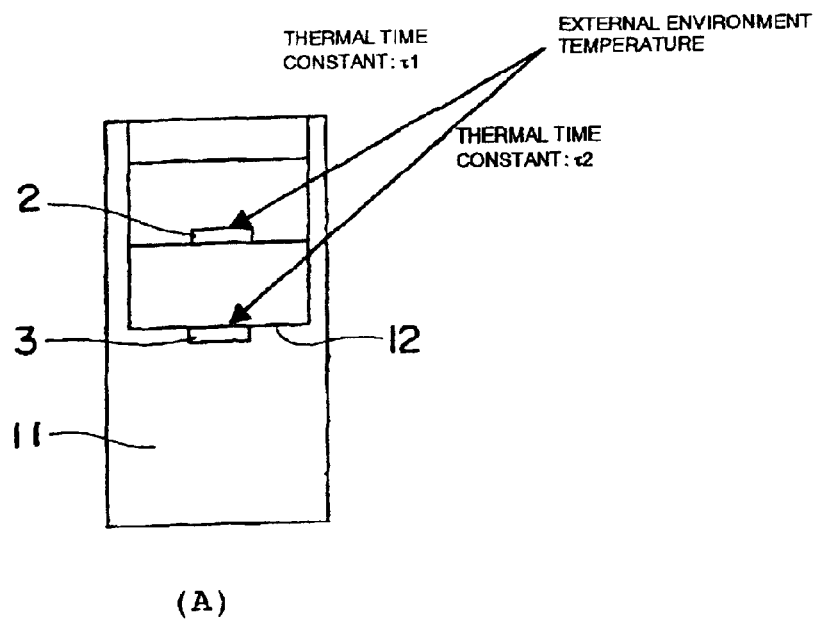
(A)
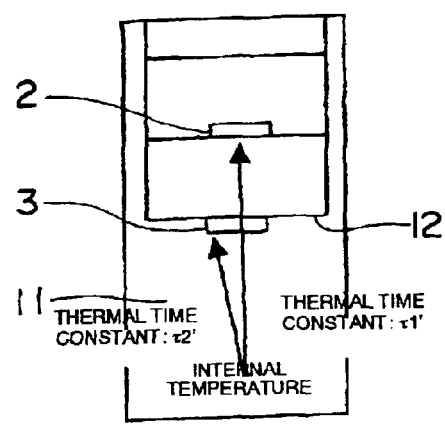
(B)

[FIG. 13]
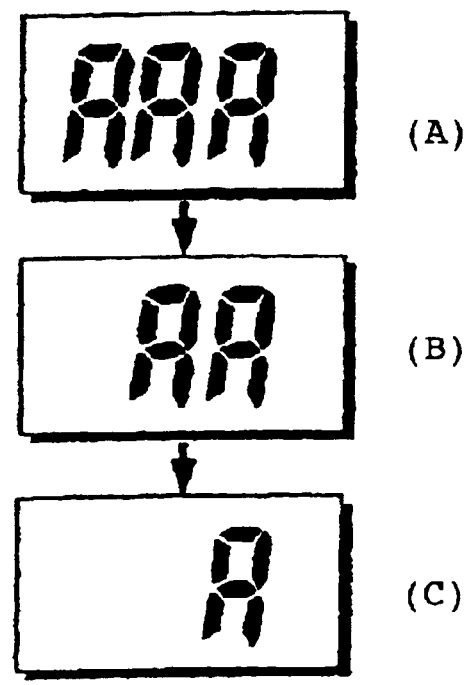
(A)
(B)
(C)
[FIG. 14]
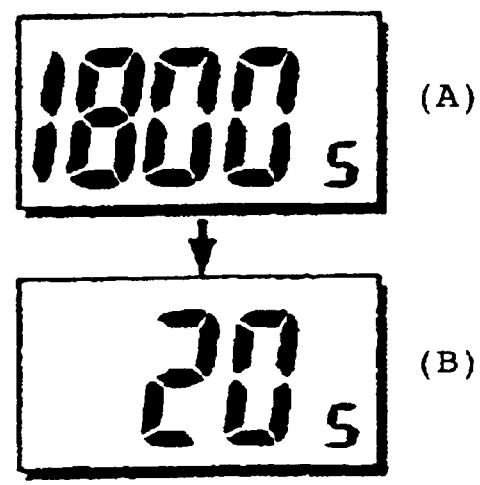
(A)
(B)

[FIG. 15]
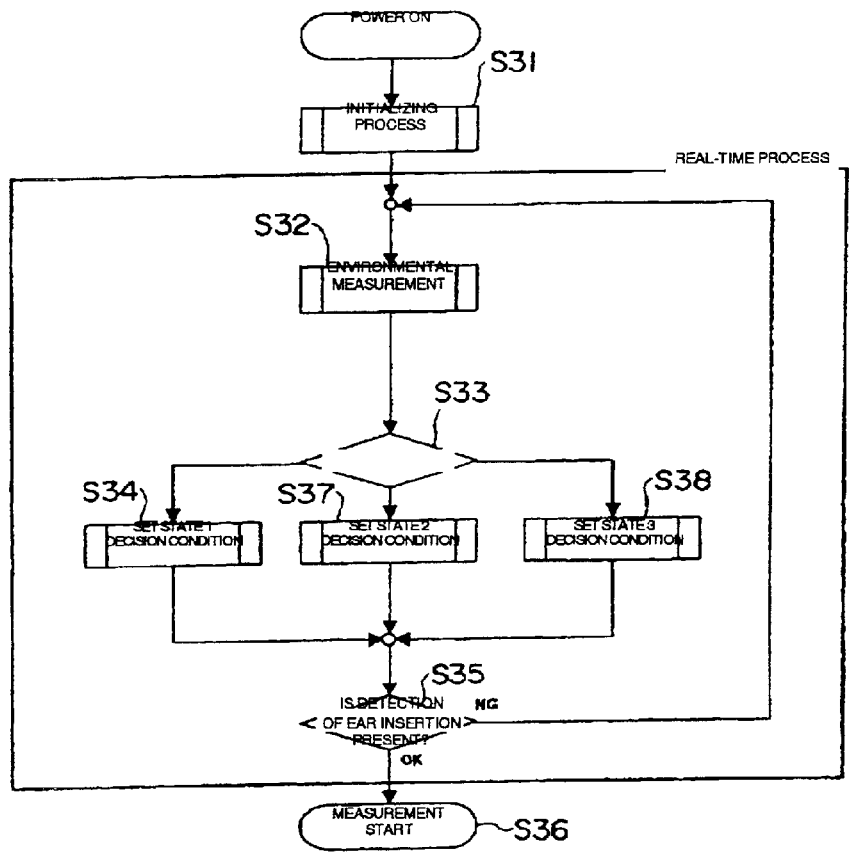
[FIG. 16]
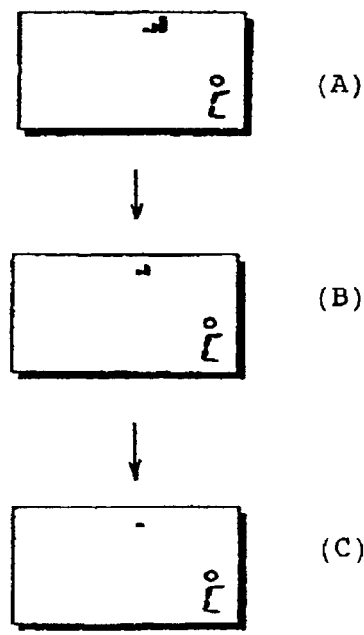

[FIG. 17]
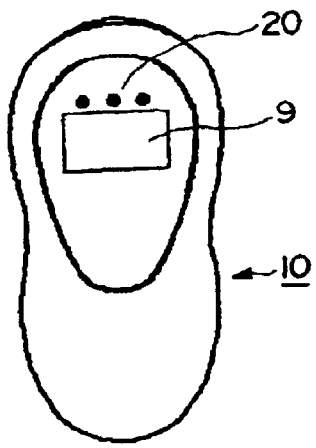
[FIG. 18]
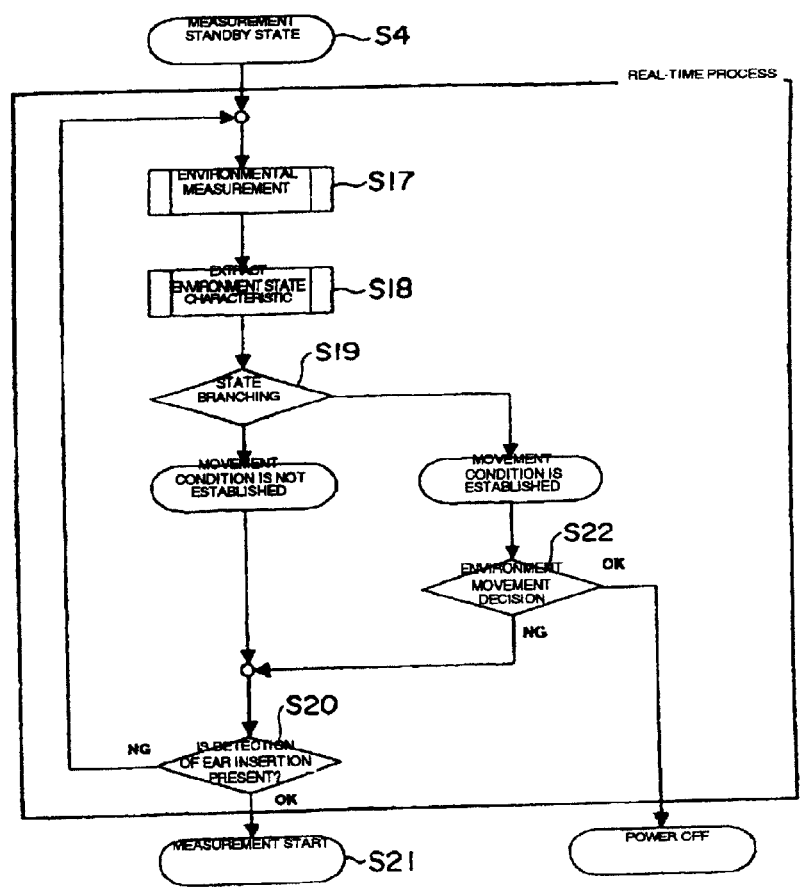

[FIG. 19]
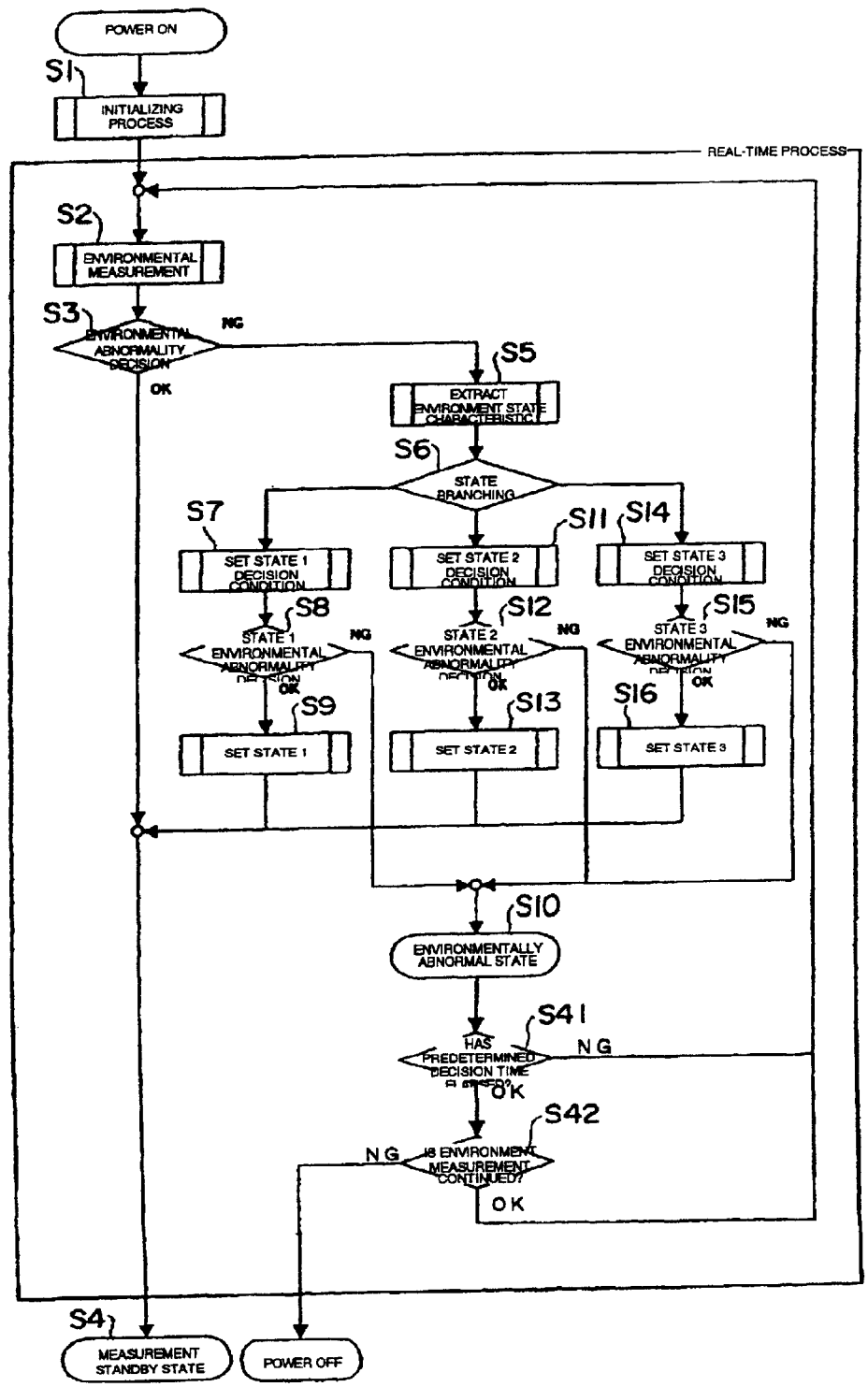

INFRARED CLINICAL THERMOMETER AND TEMPERATURE STATE ESTIMATION METHOD, INFORMATION NOTIFICATION METHOD, AND MEASUREMENT OPERATION METHOD THEREOF

BACKGROUND OF THE INVENTION

1. Field of the Invention

The present invention relates to an infrared ear thermometer which is inserted into an external ear canal and detects an infrared radiation to estimate a body temperature, and a temperature state estimation method, an information notification method, and a measurement operation management method thereof.

2. Description of the Related Art

An infrared ear thermometer measures a dose of infrared ray radiated from an ear drum to determine a body temperature. A temperature detection unit of the infrared ear thermometer is constituted by an infrared sensor which captures an infrared radiation and a temperature sensor which measures the temperature of the sensor itself, and measures a target temperature by using output signals from the infrared sensor and the temperature sensor. As an ideal measurement condition, it is required that the temperature of the infrared sensor and the temperature of the temperature sensor are equal to each other. However, in actual use, these temperatures are different from each other, and measurement body temperature accuracy is deteriorated. In particular, when an environment temperature (atmospheric temperature) at which the clinical thermometer is placed sharply changes before and after the measurement, different heat flows are generated from the clinical thermometer to the infrared sensor and the temperature sensor. A temperature difference between the sensors is generated. As a result, the body temperature measurement value has an error.

For this reason, in a conventional clinical thermometer, in measuring a body temperature by detecting an environment temperature, when the environment temperature is different from a normal room temperature, the environment temperature is checked to see if it is stabilized and whether the body temperature can be measured. When the environment temperature is detected as described above, in the prior art, the environment temperature and a change in the environment temperature are detected by a change in temperature of the temperature sensor of the clinical thermometer. Furthermore, a temperature measurement value is also corrected in consideration of the environment temperature.

However, when a change in environment temperature is detected by using a change in temperature of the temperature sensor of the clinical thermometer, even though the change of the temperature sensor is converged in a state in which the temperature of the temperature sensor and the temperature of the infrared sensor are different from each other, a measurement error is not converged, and the temperature measurement value has an error. When the temperature measurement value is corrected in consideration of the environment temperature, accurate correction cannot be performed in a state in which the environment temperature changes.

SUMMARY OF THE INVENTION

The present invention has been made to solve the problems of the prior art, and provides a clinical thermometer which can perform accurate measurements by properly estimating the environment temperature and a thermometer temperature.

The present invention is an infrared clinical thermometer including: infrared detector for detecting infrared rays; infrared detection temperature measurement unit for measuring a temperature of the infrared detector or a temperature of a nearby position; at least two temperature measurement units for measuring temperatures of positions having different thermal environments; temperature state estimation unit for estimating a temperature state of at least one of the body of the clinical thermometer and the environment in which the clinical thermometer is placed based on the temperature measured by the temperature measurement unit; and body temperature estimation unit for estimating a body temperature of a test subject based on a dose of infrared ray detected by the infrared detector, the temperature measured by the infrared detection temperature measurement unit, and the temperature state estimated by the temperature state estimation unit.

When the temperatures of the positions having different thermal environments are measured, a thermal time constant of a part between these positions is calculated, and the thermal time constant is converted to obtain a thermal time constant of an arbitrary position. For this reason, one or both of the temperature states of the clinical thermometer body and the environment in which the clinical temperature is placed can be accurately estimated. Therefore, in not only a case in which the environment temperature is stable, but also in a case in which the environment temperature and the temperature of the clinical thermometer body change, the clinical thermometer can appropriately cope with the changes in temperature, and accurate body temperature estimation can be performed regardless of the position where the clinical thermometer is held and the position where the clinical thermometer is used.

The different thermal environments mentioned here are, e.g., environments in which thermal time constants around positions where the temperature measurement unit are arranged are different from each other, and indicate environments in which heat flows from a surrounding area to the temperature measurement unit. As the temperature measurement unit, at least two temperature measurement units may be used. One of the temperature measurement units may be the same as the infrared detection temperature measurement unit.

The temperature state estimation unit preferably includes an environment temperature change index calculation unit for calculating an environment temperature monotonously changed with respect to a change in environment temperature based on the temperature measured by the temperature measurement unit.

As the environment temperature change index monotonously changed with respect to the change in environment temperature, for example, a function such as a linear expression which uses, as variables, a change rate of a temperature of a first position which is easily influenced by the environment in which the thermometer is placed and a difference between a temperature of a second position which is any position (may be a typical position of the inside of the thermometer) in the thermometer body and the temperature of the first position is used.

The environment temperature change index calculated by the environment temperature change index calculation unit is preferably an index which is correlated to an estimation error of a body temperature.

The environment temperature change index which is correlated to the estimation error of the body temperature is more preferably an index which changes as well as the estimation error of the body temperature and which can equated with the estimation error.

The temperature state estimation unit preferably estimates at least one of temperature states of the body of the clinical thermometer and the environment in which the clinical thermometer is placed based on a change pattern of the temperature measured by the temperature measurement unit.

As the change pattern of the measured temperature, for example, a combination of a positive or negative sign (including 0) of the temperature of the first position which is easily influenced by the environment in which the clinical thermometer is placed and a positive or negative sign (including 0) of a difference between the temperature of the second position which is any position (may be a typical position of the inside of the thermometer) in the thermometer body and the temperature of the first position is known. However, the change pattern is not limited to this combination.

The infrared clinical thermometer preferably causes the temperature state estimation unit to estimate that a temperature state corresponding to a state obtained immediately after the clinical thermometer is used for a test subject is set.

The state obtained immediately after the clinical thermometer is used for a test subject unit a state in which a temperature state (heat) obtained when the test subject uses the clinical thermometer remains in the body of the clinical thermometer, and does not always mean a state obtained temporally immediately after the clinical thermometer is used for the test subject.

The infrared clinical thermometer preferably discriminates a temperature state corresponding to the state obtained immediately after the clinical thermometer is used for a test subject from a temperature state corresponding to another change in environment temperature.

The infrared clinical thermometer preferably inhibits body temperature measurement by the clinical thermometer until the environment temperature is stabilized when the temperature state corresponding to the change in environment temperature is estimated by the temperature state estimation unit.

The infrared clinical thermometer preferably includes a process selection unit for selecting a process performed when the temperature state corresponding to the state obtained immediately after the clinical thermometer is used for the test subject.

The infrared clinical thermometer preferably includes a temperature state notification unit for notifying a user of the temperature state.

In this manner, since a user can properly perform body temperature measurement with a small estimation error, a more correct body temperature estimation value can be obtained. Since the recognition of the use about a proper position and a measurement position of the clinical thermometer is improved, correct body temperature measurement can be performed within a short period of time.

As the notification unit, a display unit for notifying the user through visual sensation such as characters, graphics, light, or colors or voice generation unit for notifying the user through auditory sensation such as sound may be used. The notification unit is not limited to these means, and any means for exciting the five senses of the user to cause the user to recognize a temperature state may be used. The notification unit can preferably recognize temperature states changed by gradually changing notification contents or methods. The gradual notification is more preferably performed such that the user can recognize that a state is close to a state suitable for body temperature measurement.

The infrared clinical thermometer preferably includes a temperature state notification unit for notifying a user of the temperature state, and the temperature state notification unit preferably notifies the user of a temperature state regulated depending on the value of the environment temperature change index.

The infrared clinical thermometer preferably includes a temperature state notification unit for notifying a user of the temperature state, and the temperature state notification unit preferably notifies the user of the temperature state such that the temperature state is related to an estimation error of a body temperature.

The infrared clinical thermometer preferably includes a temperature state notification unit for notifying a user of the temperature state, and the temperature state notification unit preferably notifies the user of the temperature state such that the temperature state is related to reliability of a body temperature.

The infrared clinical thermometer preferably includes a measurement operation management unit for inhibiting and permitting body temperature measurement by the clinical thermometer depending on the temperature state estimated by the temperature state estimation unit.

In order to inhibit the body temperature measurement, a power supply of the clinical thermometer may be turned off to inhibit the use itself of the clinical thermometer, a detection operation of a dose of infrared rays may be inhibited, or detected or measured data may be voided by disposition or the like to inhibit the body temperature measurement.

The measurement operation management unit preferably determines whether the estimation of a temperature state by the temperature state estimation unit is continued depending on the temperature state when the temperature state in which the body temperature measurement is to be inhibited is set.

Even in a temperature state in which a body temperature is not appropriately measured, an estimation process of the temperature state may be repeated, and the temperature state may change into a temperature state in which body temperature measurement can be performed as time goes on. When the temperature state estimation process is continued by a determination made by the measurement operation management unit, measurement can be performed even in such a case. For this reason, user convenience is improved.

The infrared clinical thermometer preferably has a management information notification unit for notifying a user that at least one of an inhibition state and a permission state of the body temperature measurement by the clinical thermometer is set.

The notification which notifies the user that at least one of an inhibition state and a permission state of the body temperature measurement by the clinical thermometer is set includes not only a case in which the user is notified that the body temperature measurement is directly inhibited or permitted, but also a case in which the user is notified that the body temperature measurement is indirectly inhibited by notifying the user of information notified only when the body temperature measurement is inhibited and a case in which the user is notified that the body temperature measurement is indirectly permitted by performing a notification process such as display for causing the user to perform a normal measurement operation.

The infrared clinical thermometer preferably includes a measurement operation management unit for inhibiting and permitting body temperature measurement by the clinical thermometer depending on a value of the environment temperature change index and management information notification unit for notifying the user that at least one of an inhibition state and a permission state of the body temperature measurement by the clinical thermometer is set, and the measurement operation management unit preferably sets a reference value of an environment temperature change index for deciding whether the body temperature measurement by the clinical thermometer is inhibited or permitted based on a change pattern of a temperature measured by the temperature measurement unit.

The infrared clinical thermometer preferably estimates the temperature state by the temperature state estimation unit until a body temperature of a test subject is measured after a power supply is turned on.

When the temperature state estimation timing is limited, the temperature state can be accurately estimated without complicating the process.

The infrared clinical thermometer preferably includes an environment temperature estimation unit for estimating a temperature of an arbitrary point of an external environment of the clinical thermometer.

When the temperature itself of the external environment of the clinical thermometer is estimated as described above, a more exact process can be performed in estimation of a temperature state of at least one of the body of the clinical thermometer and an environment in which the clinical thermometer is placed.

The infrared clinical thermometer preferably includes an internal temperature estimation unit for estimating a temperature of an arbitrary portion of the clinical thermometer interior based on the temperature measured by the temperature measurement unit.

When the temperature itself of the arbitrary portion in the clinical thermometer body is estimated, a more exact process can be performed in estimation of a temperature state of at least one of the body of the clinical thermometer and an environment in which the clinical thermometer is placed.

The infrared clinical thermometer preferably turns off a power supply of the clinical thermometer depending on the temperature state estimated by the temperature state estimation unit.

The present invention is a temperature state estimation method for infrared clinical thermometer which estimates a temperature state of at least one of a body of an infrared clinical thermometer and an environment in which the clinical thermometer is placed, including: measuring temperatures of portions having different thermal environments in the clinical thermometer; and estimating the temperature state based on the measured temperature.

The temperature state estimation method includes calculating an environment temperature change index monotonously changed with respect to a change in environment temperature based on the measured temperatures of the portions having different thermal environments in the clinical thermometer, and the temperature state is preferably estimated based on the environment temperature change index.

The temperature state estimation method includes calculating change patterns of the measured temperatures of the portions having different thermal environments in the clinical thermometer, and the temperature state is preferably estimated by the environment temperature change index and the change patterns of the measured temperatures.

The present invention is an information notification method in infrared clinical thermometer which notifies a user of information in an infrared clinical thermometer, including: measuring temperatures of portions having different thermal environments in the clinical thermometer; estimating a temperature state of at least one of the body of the clinical thermometer and an environment in which the clinical thermometer is placed based on the measured temperatures; and notifying the estimated temperature state.

The method preferably includes calculating an environment temperature change index which is an index monotonously changed with respect to a change in environment temperature and which is related to an estimation error of a body temperature based on the measurement temperatures of the portions having different thermal environments in the clinical thermometer, the temperature state is estimated based on the environment temperature change index, and the estimated temperature state is notified such that the temperature state is related to an estimation error of the body temperature.

The present invention is a measurement operation management method for infrared clinical thermometer which inhibits and permits body temperature measurement by an infrared clinical thermometer including: measuring temperatures of portions having different thermal environments in the clinical thermometer; estimating the temperature state based on the measured temperatures; inhibiting or permitting the body temperature measurement by the clinical thermometer based on the estimated temperature state; and notifying a user that the body temperature measurement by the clinical thermometer is inhibited or permitted.

The present invention is a measurement operation management method for infrared clinical thermometer which inhibits and permits body temperature measurement by an infrared clinical thermometer, including measuring temperatures of portions having different thermal environments in the clinical thermometer; estimating the temperature state based on the measured temperatures; inhibiting or permitting the body temperature measurement by the clinical thermometer based on the estimated temperature state; notifying a user the temperature state such that the temperature state is related to an estimation error of a body temperature; and notifying the user that the body temperature measurement by the clinical thermometer is inhibited or permitted.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The above objective and advantages of the present invention will become more apparent by describing in detail a preferred embodiment thereof with reference to the attached drawings in which:

FIG. 1 is a block diagram showing a schematic internal structure of an infrared clinical thermometer according to an embodiment of the present invention;

FIG. 2 is an entire sectional view of the infrared clinical thermometer according to the embodiment of the present invention;

FIG. 3 is an enlarged sectional view of a probe of the infrared clinical thermometer according to the embodiment of the present invention;

FIG. 4 is a flow chart showing procedures performed from a turn-on state of a power supply to a measurement standby state in an infrared clinical thermometer according to the first embodiment of the present invention;

FIG. 5 is a graph showing a change of an environment temperature, and a change of parameter;

FIG. 6 is a graph showing temporal changes of T2 and T3;

FIG. 7 is a graph showing temporal changes of ΔT2 and T3−T2;

FIG. 8 is a diagram showing a display example of an LCD;

FIG. 9 is a diagram showing another display example of the LCD;

FIG. 10 is a decision table of a temperature state;

FIG. 11 is a flow chart showing procedures subsequent to a measurement standby state of the infrared clinical thermometer according to the first embodiment of the present invention;

FIGS. 12A and 12B are diagrams for explaining temperature estimation principles of an external environment and an arbitrary point in an infrared clinical thermometer;

FIGS. 13A, 13B, and 13C are diagrams showing display examples of the LCD in the infrared clinical thermometer according to the first embodiment of the present invention;

FIGS. 14A and 14B are diagrams showing other display examples of the LCD in the infrared clinical thermometer according to the first embodiment of the present invention;

FIG. 15 is a flow chart showing procedures of an infrared clinical thermometer according to the second embodiment of the present invention;

FIGS. 16A, 16B, and 16C are diagrams showing display examples of an LCD in the infrared clinical thermometer according to the second embodiment of the present invention;

FIG. 17 is a diagram showing an arrangement example of the LED in the infrared clinical thermometer according to the second embodiment of the present invention;

FIG. 18 is a flow chart showing procedures in an infrared clinical thermometer according to the third embodiment of the present invention; and FIG. 19 is a flow chart showing procedures in an infrared clinical thermometer according to the fourth embodiment of the present invention.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

FIG. 1 shows an outline of the internal configuration of an infrared ear thermometer according to an embodiment of the present invention.

The clinical thermometer mainly comprises an infrared sensor (infrared detector) 1 for detecting incident infrared rays, an amplifier 4 for amplifying an output from the infrared sensor 1, two temperature sensors 2 and 3, an A/D converter 5 for converting an amplified output from an infrared sensor and output signals from the two temperature sensors from analog signals to digital signals, a CPU 6 which receives the signals converted into digital signals by the A/D converter, a power supply switch 7 for instructing a power supply to be turned on, a measurement start switch 8 for instructing measurement to be started, and an LCD (temperature state notification unit and management information unit) 9 for displaying information such as measurement value. In this case, the CPU 6 which executes a predetermined program and which controls the sections of the device constitutes a temperature state estimation unit, a body temperature estimation unit, an environment temperature change index calculation unit, a measurement operation management unit, an environment temperature estimation unit, and an internal temperature estimation unit.

FIG. 2 is a sectional view showing the positions of the infrared sensor 1, the first temperature sensor 2 and the second temperature sensor 3 in a clinical thermometer 10. FIG. 3 is an enlarged diagram showing a distal end of a probe 11. The infrared sensor 1 and the first temperature sensor (infrared detection temperature measurement unit and temperature measurement unit) 2 form an integrated unit, and are arranged to the distal end of the probe 11. The second temperature sensor 3 is attached to the bottom side of a probe holder 12 which supports the whole probe 11. The probe holder 12 is attached to the body of the clinical thermometer 10. The probe holder 12 has a hollow on the bottom side. A position to which the second temperature sensor 3 is attached is a position facing the thermometer body interior in which a circuit board 13 and the like are supported. The second temperature sensor 3 is attached to the probe holder 12, for example, consisting of an ABS resin with an UV cure adhesive. In this state, a portion which is easily influenced by an environment temperature is selected as the portion for the first temperature sensor 2, and a portion which is not easily influenced by the environment temperature is selected as the portion for the second temperature sensor 3. These selected portions have different thermal time constants obtained by a surrounding member.

Processes performed in the thermometer according to the embodiment of the present invention will be described below with reference to the flow chart shown in FIG. 4.

When a power switch of the clinical thermometer 10 is turned on, an initializing process such as clearing of a memory and display operation check of the LCD 9 is performed (step 1). In this state, immediately after the initializing process is completed, an A/D converting process for the first temperature sensor 2 and the second temperature sensor 3 is started.

An environment temperature measurement process is performed (step 2).

A portion temperature of the first temperature sensor 2 is represented by T2, and a portion temperature of the second temperature sensor 3 is represented by T3. An arithmetic process is performed to the A/D-converted outputs from the two temperature sensors 2 and 3. In the CPU 6, the AND converted outputs from the first temperature sensor 2 and the second temperature sensor 3 can be converted into temperatures of the sections of the thermometer body. In this case, the CPU 6, as described above, the temperature T3 which is the temperature of the body of the clinical thermometer (temperature of a body interior which is rarely influenced by an environment temperature) and the temperature T2 which is the environment temperature (temperature of a portion which is easy to be influenced by the environment temperature).

An environmental abnormality decision is performed (step 3).

In the environmental abnormality decision, on a curve plotted on the graph shown in FIG. 5, OK is decided when a parameter of the ordinate is a predetermined decision value (reference value) (e.g., 0.2° C.) or less, and NG is decided when the parameter exceeds the predetermined decision value.

The graph shown in FIG. 5 will be described below. When a clinical thermometer which is left for a sufficiently long time at a specific high environment temperature (environment temperature before movement) is moved to a position having a specific low environment temperature (environment temperature after movement), and when a temperature outside the clinical thermometer instantaneously changes, the temperatures T2 and T3 in the clinical thermometer changes with time as shown in FIG. 6. In this case, the difference between the environment temperature before movement and the environment temperature after movement is about 10° C., a time required to make the temperature T2 stable is about several ten seconds to 1 to 2 minutes, and a time required to make the temperature T3 stable is about 20 to 30 minutes. With respect to these temperature measurement values, a change rate $\Delta T2$ ($=\partial^2 T2/\partial t^2$) and a temporal change of value T3−T2 are shown in FIG. 7. In this case, the change rate $\Delta T2$ is set as a detection parameter of a change in environment temperature, $\Delta T2$ does not change before convergence of an estimation error. For this reason, the convergence of the estimation error cannot be determined by only $\Delta T2$. Therefore, a value obtained by adding the change rate $\Delta T2$ to the value T3−T2 which continuously changes until the convergence of the estimation error is selected as an environment temperature change parameter (environment temperature change index). The environment temperature change parameter calculated in this manner monotonously changes until an influence of the environment temperature on the clinical thermometer body becomes sufficiently small. A graph showing a temporal change of the environment temperature change parameter is shown in FIG. 5. As the environment temperature change parameter calculated by $\Delta T2$ and T3−T2, for example, a linear expression $A*\Delta T2+B*(T3-T2)$, where A and B are constants can be selected. However, the environment temperature change parameter is not limited to the linear expression. The environment temperature change parameter obtained as described above has a high correlation to the estimation error. Therefore, a value of the ordinate in FIG. 5 can be identified with the estimation error. For this reason, in the following expression, the environment temperature change parameter will be properly handled as the estimation error.

When NO is decided as a result of the environmental abnormality decision in step 3, the error is converged, and the environment temperature does not change. For this reason, a measurement standby state is set (step 4). In a real-time process subsequent to the initializing process, "AAA" is displayed on the LCD 9 as shown in FIG. 8. However, the measurement standby state is set, "° C." is displayed on the LCD 9 as shown in FIG. 9.

When YES is decided as a result of the environmental abnormality decision in step 3, an environment state characteristic extraction process is performed (step 5). In this case, a "change in T2" and a "size of T2−T3" are calculated. Based on the calculated "change in T2" and "size of T2−T3", a state branching decision is performed (step 6). FIG. 10 is a temperature state decision table showing environment temperature states and temperature states of the clinical thermometer body which are classified depending on the "change in T2" and the "size of T2−T3".

When the "change in T2" is + (increase), and when the "size of T2−T3" is +(T2>T3) (this state is called "state 1"), the clinical thermometer is heated, the temperature of the distal end of the clinical thermometer is higher than the temperature in the clinical thermometer body, and the environment temperature also changes (In this case, "+" includes "0". This condition is the same in the following.). More specifically, the environment condition of the clinical thermometer is changed from a low-temperature condition to a high-temperature condition, and this state includes the case in which the clinical thermometer is inserted into an ear to measure a body temperature. In this case, a decision condition corresponding to state 1 is set (step 7). In this case, a description will be given by using the graph shown in FIG. 5, a setting for decreasing the level of a decision value for fixing a tolerance of the estimation error (for example, a decision value of 0.2° C. is changed into 0.1° C.) is performed. Based on the changed decision value, it is decided again whether the error is 0.1° C. or less (step 8). When the error is 0.1° C. or less in the decision in step 8, the clinical thermometer is set in state 1 (step 9). More specifically, the setting of the parameter for calculating the body temperature is changed (For example, an offset value is increased by 0.1° C.), and the state is changed to the measurement standby state in step 4. When the error exceeds 0.1° C. in the decision in step 8, it is considered that an environmentally abnormal state is set, "AAA" is displayed on the LCD 9 to notify a user that the environmentally abnormal state is set (step 10), and the control flow returns to the environment measurement process in step 2.

In step 6, when the "change in T2" is − (decrease), and when the "size of T2−T3" is − (T2<T3) (this state is called "state 2"), the clinical thermometer is cooled, the temperature of the distal end of the clinical thermometer is lower than the temperature in the clinical thermometer body, and the environment temperature changes. In this case, a decision condition corresponding to state 2 is set (step 11). In this case, a setting for decreasing the level of a decision value for fixing a tolerance of the estimation error in the graph in FIG. 5 (for example, a decision value of 0.2° C. is changed into 0.1° C.) is performed. Based on the changed decision value, it is decided again whether the error is 0.1° C. or less (step 12). When the error is 0.1° C. or less in the decision in step 12, the clinical thermometer is set in state 2 (step 13). More specifically, the setting of the parameter for calculating the body temperature is changed (for example, an offset value is decreased by 0.1° C.), and the state is changed to the measurement standby state in step 4. When the error exceeds 0.1° C. in the decision in step 12, the control flow shifts to step 11, it is considered that an environmentally abnormal state is set, "AAA" is displayed on the LCD 9 to notify a user that the environmentally abnormal state is set, and the control flow returns to the environment measurement process in step 2.

In step 6, when the "change in T2" is − (decrease), and when the "size of T2−T3" is + (T2>T3) (this state is called "state 3"), although the clinical thermometer is cooled, the temperature of the distal end of the clinical thermometer is higher than the temperature in the clinical thermometer body. This state, for example, corresponds to a state in which the clinical thermometer which is removed from the ear immediately after the clinical thermometer is used is inserted into the ear to perform re-measurement. In this case, a decision condition corresponding to state 3 is set (step 14). In this case, a setting for increasing the level of a decision value for fixing a tolerance of the estimation error in the graph in FIG. 5 (for example, a decision value of 0.2° C. is changed into 0.3° C.) is performed. The decision value is set as described above for the following reason. That is, since the distal end is warmed in the re-measurement, the estimation error is small even though the parameter largely changes. Based on the changed decision value, it is decided again whether the error is 0.3° C. or less (step 15). When the error is 0.3° C. or less in the decision in step 15, the clinical thermometer is set in state 3 (step 16). More specifically, the setting of the parameter for calculating the body temperature is changed (For example, an offset value is increased by 0.1° C.), and the state is changed to the measurement standby state in step 4. When the error exceeds 0.3° C. in the decision in step 16, the control flow shifts to step 10, it is considered that an environmentally abnormal state is set, "AAA" is displayed on the LCD 9 to notify a user that the environmentally abnormal state is set, and the control flow returns to the environment measurement process in step 2. In this manner, in the environment state characteristic extraction process, the temperature state corresponding to the state obtained immediately after the user uses the clinical thermometer is discriminated from a temperature state obtained by another environment temperature change, and the level of the decision value is changed, so that a case which is processed as an error in a conventional art can be included in normal body temperature measurement procedures. Therefore, the clinical thermometer can be applied to a case in which body temperature measurement is repeated at short time intervals as in a group medical examination, correct body temperature measurement can be performed.

In FIG. 10, a case in which the "change in T2" is + (increase) and the "size of T2–T3" is –(T2<T3) unit a state which cannot actually occur, and the state cannot be specified. In this case, for example, a process of returning the control flow to step 10 may be performed.

The processes subsequent to the measurement standby state will be described below with reference to the flow chart shown in FIG. 11.

An environment measurement process is performed (step 17). In this process, the temperatures T2 and T3 are measured by the first temperature sensor 2 and the second temperature sensor 3.

An environment state characteristic extraction process is performed (step 18). In this process, a "change in T2" and a "size of T2–T3" are extracted. Based on the extracted "change in T2" and "size of T2–T3", a state branching decision is performed (step 19). It is decided whether the state is a state in which the "change in T2" is – and the "size of T2–T3" is +, a state in which the "change in T2" is + and the "size of T2–T3" is +, or a state in which the "change in T2" is – and the "size of T2–T3" is –.

When it is decided in the decision in step 19 that the "change in T2" is – and the "size of T2–T3" is +, a movement condition is not established, i.e., the environment does not change. For this reason, according to whether the temperature T2 exceeds 34° C., the presence/absence of ear insertion detection of the clinical thermometer is decided (step 20). When the ear insertion detection of the clinical thermometer is absent, the control flow returns to the environment measurement process in step 17. When the ear insertion detection of the clinical thermometer is present, measurement is started (step 21).

When it is decided in step 19 that the "change in T2" is + and the "size of T2–T3" is +, or that the "change in T2" is – and the "size of T2–T3" is –, the movement condition is established, i.e., the environment changes. For this reason, an environment movement decision is performed (step 22). In this case, the parameter of the ordinate on the curve plotted on the graph in FIG. 5 is a decision value (e.g., 0.2° C.) of a default or less, NG is decided (environmental abnormality is absent), and the control flow shifts to the ear insertion detection presence/absence decision in step 20. When the parameter exceeds the decision value, OK (environmental abnormality is present), "AAA" is displayed on the LCD 9 to notify the user that the environmental abnormality is present (step 10), and the control flow returns to the environment measurement process in step 2.

In the state branching process in step 19, in the measurement standby state, it is decided whether a state obtained immediately after the clinical thermometer is inserted into an ear or a state in which an environment temperature changes is set. The processes depending on these states are performed.

After the clinical thermometer is set in the measurement standby state as shown in FIG. 11, and environment measurement is performed. In this case, when the temperature state changes in the measurement standby state, e.g., when the clinical thermometer body is carried to another room having another temperature while setting the clinical thermometer in the measurement standby state or when the clinical thermometer is carried to a place, such as a place near the mouth of an air conditioner, having another temperature in the same room, body temperature measurement can be performed at high accuracy.

The temperatures of portions having different surrounding thermal time constants are measured by the temperature sensors 2 and 3, and the temperatures are converted, so that both or one of the temperature states of the clinical thermometer body and the environment in which the clinical thermometer is placed can be properly estimated. Therefore, the clinical thermometer can properly cope with not only a case in which an environment temperature is stabilized but also a case in which the environment temperature or the temperature of the clinical thermometer body changes. A body temperature can be estimated at high accuracy regardless of a position where the clinical thermometer is held or a position where the clinical thermometer is used.

By using the temperature sensors 2 and 3 arranged the positions having different surrounding thermal time constants as described above, the temperature at an arbitrary point in the environment in which the clinical thermometer is placed and the temperature of an arbitrary point in the clinical thermometer can also be estimated.

For example, as typically shown in FIG. 12A, a thermal time constant between an arbitrary point $P_0$ in the environment outside the clinical thermometer and the temperature sensor 2 is represented by $\tau_1$, and a thermal time constant between the arbitrary point $P_0$ and the temperature sensor 3 is represented by $\tau_2$. In this case, a temperature $T_0$ of the point $P_0$ is expressed by:

$$T_0 = (\tau_1 \times \alpha_1 + \tau_2 \times \beta_1) \times \gamma + (\tau_1 \times \alpha_2 + \tau_2 \times \beta_2)$$

where $\alpha_1$, $\beta_1$, $\gamma$, $\alpha_2$, and $\beta_2$ are constants, respectively. The thermal time constants $\tau_1$ and $\tau_2$ are expressed by:

$$\tau_1 = (T2(n) - T2(n-1)) \times Q_1$$

$$\tau_2 = (T3(n) - T3(n-1)) \times Q_2$$

where T2(n) and T3(n) are measurement values in the nth (n is an integer which is 2 or more) sampling of the temperature sensors 2 and 3, and $Q_1$ and $Q_2$ are constants, respectively.

In this manner, the respective change rates are calculated based on the measurement values of the temperature sensors 2 and 3, and thermal time constants between the arbitrary point in the environment outside the clinical thermometer and the temperature sensors are calculated by the change rates of the temperature measurement values. When the thermal time constants are substituted to a predetermined calculation expression, the temperature of the arbitrary point outside the clinical thermometer can be calculated.

Similarly, as typically expressed in FIG. 12B, a thermal time constant between an arbitrary point $P_{IN}$ in the environment in the clinical thermometer and the temperature sensor 2 is represented by $\tau'_1$, and a thermal time constant between the arbitrary point $P_{IN}$ and the temperature sensor 3 is represented by $\tau'_2$. In this case, a temperature $T_{IN}$ of the point $P_{IN}$ is expressed by the following expression:

$$T_{IN}=(\tau'_1\times\alpha'_1+\tau'_2\times\beta'_1)\times\gamma'+(\tau'_1\times\alpha'_2+\tau'_2\times\beta'_2)$$

where $\alpha'_1$, $\beta'_1$, $\gamma'$, $\alpha'_2$, and $\beta'_2$ are constants, respectively. The thermal time constants $\tau'_1$ and $\tau'_2$ are expressed by:

$$\tau'_1=(T2(m)-T2(m-1))\times Q'_1$$

$$\tau'_2=(T3(m)-T3(m-1))\times Q'_2$$

where T2(m) and T3(m) are measurement values in the mth (m is an integer which is 2 or more) sampling of the temperature sensors 2 and 3, and $Q'_1$ and $Q'_2$ are constants, respectively.

In this manner, the respective change rates are calculated based on the measurement values of the temperature sensors 2 and 3, and thermal time constants between the arbitrary point in the clinical thermometer and the temperature sensors are calculated by the change rates of the temperature measurement values. When the thermal time constants are substituted to a predetermined calculation expression, the temperature of the arbitrary point in the clinical thermometer can be calculated.

When the temperature itself of the environment outside the clinical thermometer or the arbitrary point in the clinical thermometer is calculated, the temperature states of the environment outside the clinical thermometer or the clinical thermometer interior can be more exactly specified. Therefore, a more exact condition is set by the condition branching process based on the temperature state, so that proper processes depending on the temperature states can be performed. For example, it is calculated by the measurement values of the temperature sensors 2 and 3 whether a degree at which a probe is inserted into an ear of a test subject, i.e., a degree at which the probe is in contact with a heat source. A temperature estimation process depending on the temperature state specified as described above.

Since the body temperature measurement is performed with a small estimation error, a more accurate body temperature measurement value can be obtained. Since the recognition of a user with regard to a proper position where the clinical thermometer is held and a proper position where the measurement is performed is improved, a correct measurement value can be obtained within a short time.

In the embodiment described above, "AAA" or "° C." is displayed on the LCD 9 to notify a user whether measurement can be performed, i.e., of an error state. However, the notification method is not limited to this method. For example, voice, buzzer, a light-emitting unit such as an LED, or a dedicated icon can also be used, and these unit constitute a temperature state notification unit.

In the procedures shown in FIG. 4, the "AAA" is displayed on the LCD 9 in the environmental abnormal state, and the "° C." is displayed on the LCD 9 in the step in which the state moves into the measurement standby state. The value of the environment temperature change parameter (estimation error) is continuously monitored. The value monotonously decreases in general and is gradually converged. For this reason, a predetermined reference value is set in advance, and the display of "AAA" (FIG. 13A) on the LCD 9 may be switched to a display of "AA" (FIG. 13B) and a display of "A" (FIG. 13C). In this manner, the user can recognize that the temperature state becomes stable and that the error is gradually converged to cause the state to be close to a state in which accurate measurement can be performed, so that recognition with regard to a proper position where the clinical thermometer is held and a proper position where the measurement is performed is more improved. Various change patterns of the environment temperature change parameters are stored in advance, and a corresponding pattern is selected from the change patterns stored by the sampling of the temperatures T2 and T3, so that a time required to converge the environment temperature change parameter can be approximated. As shown in FIGS. 14A and 14B, such a time is displayed on the LCD 9, and the display time is decreased with the convergence, so that the similar effect can be obtained.

As described above, according to this embodiment, an environmental abnormality decision and an environment state characteristic extraction process are performed until body temperature measurement after the power supply is turned on. Estimation of a temperature state based on a measurement value of a temperature sensor can also be performed at a timing except for the above timing as a matter of course. However, before the measurement operation performed by a user, a manner that the probe is in contact with a heat source is relatively restricted. For this reason, an accurate temperature state can be estimated without performing a complex process.

The second embodiment of the present invention will be described below. Since the configuration of a clinical thermometer is the same as that in the first embodiment, a description thereof will be omitted. The clinical thermometer according to this embodiment notifies a user of the reliability of a measurement value depending on an estimation error.

Procedures in the clinical thermometer according to this embodiment will be described below with reference to the flow chart shown in FIG. 15.

When the power supply switch of the clinical thermometer is turned on, an initializing process such as clearing of a memory or a display operation check of the LCD 9 is performed (step 31).

An environment measurement process is performed (step 32).

A branching decision of an error level is performed based on a result of the environment measurement process (step 33).

The error level is decided based on an error expressed by an environment temperature change parameter described in the first embodiment.

When the error is 0° C. or more and lower than 0.2° C. (this state is called "state 1"), the level of a decision value of the error indicated by the graph in FIG. 5 is decreased (for example, a decision value of 0.2° C. is changed into 0.1° C.), so that a decision condition corresponding to state 1 is set (step 34). At this time, as shown in FIG. 16A, three bars are displayed on the LCD 9 to notify the user that the reliability of the body temperature estimation value is high. After the decision condition is set as described above, by checking whether the temperature T2 exceeds 34° C., the presence/absence of ear insertion detection of the clinical thermometer is decided (step 35). When the ear insertion detection of the clinical thermometer is absent, the control flow returns to the environment measurement process in step 32. When the ear insertion detection of the clinical thermometer is present, measurement is started (step 36).

When the error is 0.2° C. or more and lower than 0.6° C. in step 33 (this state is called "state 2"), the level of a decision value of the error indicated by the graph in FIG. 5 is decreased (for example, a decision value of 0.2° C. is changed into 0.1° C.), so that a decision condition corresponding to state 2 is set (step 37). At this time, as shown in FIG. 16B, two bars are displayed on the LCD 9 to notify the user that the reliability of the body temperature estimation value is intermediate. After the decision condition is set as described above, those control flow shifts to the process of deciding the presence/absence of ear insertion detection in step 35.

When the error is 0.6° C. or more in step 33 (This state is called "state 3".), the level of a decision value of the error indicated by the graph in FIG. 5 is increased (for example, a decision value of 0.2° C. is changed into 0.3° C.), so that a decision condition corresponding to state 3 is set (step 38). At this time, as shown in FIG. 16C, one bar is displayed on the LCD 9 to notify the user that the reliability of the body temperature estimation value is low. After the decision condition is set as described above, those control flow shifts to the process of deciding the presence/absence of ear insertion detection in step 35.

In this manner, since the user recognizes the reliability of a body temperature estimation value of a clinical thermometer, the measurement value can be properly evaluated. Recognition of a user with regard to a condition under which reliable measurement can be performed, i.e., recognition with regard to a proper position where the clinical thermometer is held and a proper position where the measurement is performed is more improved, and accurate measurement can be performed within a short time.

In the embodiment described above, the level of the reliability is displayed by the number of bars. The display method of reliability is not limited to this method. As shown in FIG. 17, three concolorous LEDs (temperature state notification unit) 20 are arranged, and the number of lighted LEDs can be increased depending on the reliability. In addition, three LEDs having different colors such as blue, yellow, and red are arranged, and a different LED can be lighted depending to the reliability. Furthermore, the reliability can be notified with voice or buzzer. A time returned to set a state in which the measurement can be performed is displayed on the LCD 9, and time gradually decreased is displayed to notify the user of the reliability. In place of the display of the bars, as shown in FIGS. 13A, 13B and 13C, a manner that the reliability of an estimation value increases can be displayed by displaying "AAA"→"AA"→"A".

The third embodiment of the present invention will be described below. Since the configuration of a clinical thermometer is the same as that in the first embodiment, a description thereof will be omitted. The clinical thermometer according to this embodiment is automatically powered off when the clinical thermometer is moved to another environment.

Procedures in the clinical thermometer according to this embodiment will be described below with reference to the flow chart shown in FIG. 18.

Since the processes performed until the clinical thermometer is set in a measurement standby state are the same as those in the first embodiment shown in FIG. 4, a description thereof will be omitted. Processes performed from when the clinical thermometer is set in the measurement standby state to when measurement is started are almost the same as the processes of the first embodiment shown in FIG. 11. For this reason, the description of the same processes will be omitted by using the same reference numerals, and only the different processes will be described below.

In this embodiment, in the environment movement decision (step 22), an environment temperature change parameter of the ordinate on the curve plotted on the graph in FIG. 5 exceeds a decision value (e.g., 0.2° C.) of a default, OK (environmental abnormality is present), and the power supply is automatically turned off.

In this manner, under the condition which is improper for measurement, the power supply is automatically turned off, and measurement is not performed. For this reason, an improper measurement value is not shown to the user, and the clinical thermometer can cause the user to clearly understand whether the environment condition is proper for measurement.

The fourth embodiment of the present invention will be described below. Since the configuration of a clinical thermometer is the same as that in the first embodiment, the same reference numerals as in the first embodiment denote the same parts and processes in the fourth embodiment, and a description thereof will be omitted.

Procedures in the clinical thermometer according to this embodiment will be described below with reference to the flow chart shown in FIG. 19.

The processes of the clinical thermometer in the forth embodiment are the same as those of the clinical thermometer in the first embodiment shown in FIG. 4 except for the processes performed from when environmental abnormality is decided in an environmental abnormality decision in each state to when environment measurement in step 2 is performed.

After environmental abnormality is decided in step 8, 12, or 15, an environmental abnormal state is displayed (step 10). In this embodiment, a time elapsed after the environment measurement process is stated is acquired from a timer (not shown), and it is decided whether the time exceeds a predetermined time (e.g., 1 second) (step 41). When the elapsed time does not exceed the predetermined time in step 41, the control flow returns to step 2 to repeat the environment measurement. When the elapsed time exceeds the predetermined time, it is decided whether the environment measurement is continued (step 42). In this case, for example, by checking whether a predetermined decision value $\epsilon$ (e.g., 0.2) satisfies $\Delta T2 \leq \epsilon$ (e.g., 0.2), the control flow returns to the environment measurement to decide whether estimation of a temperature state is continued. More specifically, when $\Delta T2 > \epsilon$ is satisfied, the power supply is automatically turned off, and when $\Delta T2 \leq \epsilon$ is satisfied, the control flow returns to step 2 to repeat the environment measurement.

When an environmental abnormality decision is repeated for a predetermined time or longer, and when the state does not reach a measurement standby state, the temperature state of the clinical thermometer is not stable. For this reason, accurate body temperature measurement is not expected. In this case, a process of automatically turning off the power supply is performed. However, the value $\Delta T2$ is an index which gradually decreases according to the stabilization of the temperature state to be converged to a predetermined value. For this reason, when the value $\Delta T2$ is smaller than a predetermined value as in step 42, the environmental abnormality decision is continued without turning off the power supply. After a little time has elapsed, the temperature state may be stabilized, and the measurement standby state may be set. As the temperature state which is converged and stabilized for a short time, for example, a temperature state obtained when a test subject touches the probe to exchange probe covers or erroneously touches the probe is considered. A time for the environmental abnormality decision process is extended depending on a temperature state of the clinical thermometer, and a process which is different from the process performed in case of simple environmental abnormality when a temperature state which may be stabilized for a short time is set, so that the user can perform body temperature measurement even in the above case. Therefore, user convenience is improved.

The fifth embodiment of the present invention will be described below.

The configuration of a clinical thermometer according to this embodiment is the same as the clinical thermometer according to the first embodiment, a description thereof will be omitted. The same reference numerals as in the first embodiment denote the same processes in the fifth embodiment, and a description there of will be omitted.

The clinical thermometer according to this embodiment performs, as environmental abnormality decision processes, the same processes as those in the first embodiment except for the processes in step 14 to step 16 in the flow chart shown in FIG. 4. More specifically, the clinical thermometer according to this embodiment, a decision condition corresponding to state 3 in step 14, the level of a decision value for determining a tolerance of an estimation error in the graph shown in FIG. 5 is set to be a large value such as 1.5□C, 3□C, or the like. After the decision value is set, the environmental abnormality decision of state 3 in step 15 and a setting corresponding to state 3 of the clinical thermometer in step 16 are performed by the same manner as that in the first embodiment. When the decision condition corresponding to state 3 is set as described above, in many cases, errors are the decision value or less, and it is decided that environmental abnormality is absent, and the control flow shifts to the measurement standby state in step 4. When an outdoor air temperature is low as in winter or in a cold district, if the decision value of state 3 is set as in the first embodiment, it tends to be frequently decided in state 3 that environmental abnormality is present. For this reason, also in this case, the process is not performed while considering that the environmental abnormality is present, and the environmental abnormality decision corresponding to state 3 is made void as a matter of fact, and a process is performed such that body temperature measurement can be performed. Therefore, improvement in convenience of a user can be achieved.

The setting of the decision value of state 3 may be performed by a user such that a switch (process selection unit) for changing a setting is arranged. In addition, a switch (process selection switch) which can be operated by only a special operation such as disassembly may be arranged on a circuit board or the like, and the switch may be changed before the product is shipped toward a cold district.

In the state branching in step 6 of the flow chart shown in FIG. 4, the control flow can also be advanced to the measurement standby process in step 4 right away when the state corresponds to state 3.

As has been described above, according to the present invention, both or one of the temperature states of a clinical thermometer body and an environment in which the clinical thermometer is placed can be properly estimated. Therefore, not only a case in which the environment temperature is stable, but also a case in which the environment temperature and the temperature of the clinical thermometer body change, the clinical thermometer can appropriately cope with the changes in temperature, and accurate body temperature estimation can be performed regardless of a position where the clinical thermometer is held and a position where the clinical thermometer is used.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An infrared clinical thermometer, comprising:

infrared detector for detecting infrared rays;

infrared detection unit temperature measurement unit for measuring a temperature of said infrared detector or a temperature of a nearby position;

at least two temperature measurement units for measuring temperatures of positions having different thermal environments;

temperature state estimation unit for estimating a temperature state of at least one of the body of the clinical thermometer and an environment at which the clinical thermometer is placed based on the temperature measured by the temperature measurement units; and body temperature estimation unit for estimating a body temperature of a test subject based on a dose of infrared ray detected by the infrared detector, the temperature measured by said infrared detection temperature measurement unit, and the temperature state estimated by said temperature state estimation unit.

2. An infrared clinical thermometer according to claim 1, wherein the temperature state estimation unit comprises environment temperature change index calculation unit for calculating an environment temperature monotonously changed with respect to a change in environment temperature based on the temperature measured by said temperature measurement unit.

3. An infrared clinical thermometer according to claim 2, comprising temperature state notification unit for notifying a user of said temperature state, wherein said temperature state notification unit has a function of notifying the user of a temperature state regulated depending on the value of said environment temperature change index.

4. An infrared clinical thermometer according to claim 1, comprising:

a measurement operation management unit for inhibiting and permitting body temperature measurement by the clinical thermometer depending on a value of the environment temperature change index; and management information notification unit for notifying a user that at least one of an inhibition state and a permission state of the body temperature measurement by said clinical thermometer is set, wherein the measurement operation management unit has a function of setting a reference value of an environment temperature change index for deciding whether the body temperature measurement by the clinical thermometer is inhibited or permitted based on a change pattern of a temperature measured by said temperature measurement unit.

5. An infrared clinical thermometer according to claim 2, wherein the environment temperature change index calculated by the environment temperature change index calculation unit is an index which is correlated to an estimation error of a body temperature.

6. An infrared clinical thermometer according to claim 5, comprising said temperature state notification unit which notifies a user of the temperature state, wherein said temperature state notification unit has a function of notifying the user of said temperature state such that the temperature state is related to an estimation error of a body temperature.

7. An infrared clinical thermometer according to claim 5, comprising temperature state notification state which notifies a user of said temperature state,
wherein said temperature state notification unit has a function of notifying the user of said temperature state such that the temperature state is related to reliability of a body temperature.

8. An infrared clinical thermometer according to claim 1, wherein said temperature state estimation unit has a function of estimating at least one of temperature states of the body of the clinical thermometer and the environment in which the clinical thermometer is placed based on a pattern of change of the temperature measured by said temperature measurement unit.

9. An infrared clinical thermometer according to claim 1, wherein the infrared clinical thermometer has a function of causing said temperature state estimation unit to estimate that a temperature state corresponding to a state obtained immediately after the clinical thermometer is used for a test subject is set.

10. An infrared clinical thermometer according to claim 9, wherein the infrared clinical thermometer has a function of causing said temperature state estimation unit to discriminate a temperature state corresponding to the state obtained immediately after the clinical thermometer is used for a test subject from a temperature state corresponding to another change in environment temperature.

11. An infrared clinical thermometer according to claim 10, wherein the infrared clinical thermometer has a function of inhibiting body temperature measurement by the clinical thermometer until the environment temperature is stabilized when the temperature state corresponding to said change in environment temperature is estimated by said temperature state estimation unit.

12. An infrared clinical thermometer according to claim 9, comprising process selection unit for selecting a process performed when the temperature state corresponding to the state obtained immediately after the clinical thermometer is used for said test subject by said temperature state estimation unit.

13. An infrared clinical thermometer according to claim 1, comprising temperature state notification unit for notifying a user of said temperature state.

14. An infrared clinical thermometer according to claim 1, comprising measurement operation management unit for inhibiting and permitting body temperature measurement by the clinical thermometer depending on the temperature state estimated by said temperature state estimation unit.

15. An infrared clinical thermometer according to claim 14, wherein said measurement operation management unit has a function of deciding whether estimation of a temperature state by said temperature state estimation unit is continued or not depending on the temperature state when the temperature state in which the body temperature measurement is to be inhibited is set.

16. An infrared clinical thermometer according to claim 14, comprising management information notification unit for notifying a user that at least one of an inhibition state and a permission state of the body temperature measurement by the clinical thermometer is set.

17. An infrared clinical thermometer according to claim 1, comprising environment temperature estimation unit for estimating a temperature of an arbitrary point of an external environment of the clinical thermometer based on temperature measured by said temperature measurement unit.

18. An infrared clinical thermometer according to claim 1, comprising internal temperature estimation unit for estimating a temperature of an arbitrary portion of said clinical thermometer interior based on the temperature measured by said temperature measurement unit.

19. An infrared clinical thermometer according to any one of claims 1 to 16, wherein the infrared clinical thermometer has a function of estimating said temperature state by said temperature state estimation unit until a body temperature of a test subject is measured after a power supply is turned on.

20. An infrared clinical thermometer according to any one of claims 1 to 16, wherein the infrared clinical thermometer turns off a power supply of the clinical thermometer depending on the temperature state estimated by said temperature state estimation unit.

* * * * *